United States Patent
Benisty et al.

(10) Patent No.: US 11,556,268 B2
(45) Date of Patent: Jan. 17, 2023

(54) CACHE BASED FLOW FOR A SIMPLE COPY COMMAND

(71) Applicant: Western Digital Technologies, Inc., San Jose, CA (US)

(72) Inventors: Shay Benisty, Beer Sheva (IL); Judah Gamliel Hahn, Ofra (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 58 days.

(21) Appl. No.: 17/237,949

(22) Filed: Apr. 22, 2021

(65) Prior Publication Data

US 2022/0342550 A1 Oct. 27, 2022

(51) Int. Cl.
G06F 3/06 (2006.01)

(52) U.S. Cl.
CPC ............ G06F 3/065 (2013.01); G06F 3/0604 (2013.01); G06F 3/0679 (2013.01)

(58) Field of Classification Search
CPC ....... G06F 3/065; G06F 3/0604; G06F 3/0679
See application file for complete search history.

(56) References Cited

U.S. PATENT DOCUMENTS

| | | | |
|---|---|---|---|
| 7,958,430 B1 | 6/2011 | Kolokowsky et al. |
| 10,007,443 B1 | 6/2018 | Rajadnya et al. |
| 10,185,658 B2 | 1/2019 | O'Krafka et al. |
| 10,452,278 B2 | 10/2019 | Benisty |
| 10,564,872 B2 | 2/2020 | Benisty |

| | | | |
|---|---|---|---|
| 2006/0187908 A1 | 8/2006 | Shimozono et al. | |
| 2009/0319720 A1 | 12/2009 | Stefanus et al. | |
| 2011/0191554 A1* | 8/2011 | Sakai | G06F 3/0689 |
| | | | 711/E12.103 |

(Continued)

FOREIGN PATENT DOCUMENTS

KR    101750744 B1    6/2017

OTHER PUBLICATIONS

NVMe, TP 4065b—Simple Copy Command, Feb. 29, 2021 [retrieved from internet Aug. 4, 2022][<URL:https://web.archive.org/web/20210805170551/https://nvmexpress.org/changes-in-nvm-express-revision-2-0/>] (Year: 2021).*

(Continued)

*Primary Examiner* — Daniel D Tsui
*Assistant Examiner* — Nicholas A. Paperno
(74) *Attorney, Agent, or Firm* — Patterson & Sheridan, LLP; Steven H. VerSteeg

(57) ABSTRACT

A method and system for cache-based flow of a simple copy command is disclosed. The present disclosure generally relates to methods and systems for executing a simple copy command in a manner that mitigates additional latency in the device. According to certain embodiments, a copy command manager that includes one or more copy command slots is provided. When a simple copy command is received from a host, a copy command slot is allocated to the command, and the simple copy command is copied into the copy command slot. Upon copying the simple copy command to the copy command slot, an overlap table of the data storage device controller is updated to indicate the copy has been completed, and the completion is posted to the host. After posting, the simple copy command is carried out in the background through completion.

17 Claims, 8 Drawing Sheets

(56) References Cited

U.S. PATENT DOCUMENTS

| | | |
|---|---|---|
| 2013/0138904 A1 | 5/2013 | Min |
| 2016/0004438 A1 | 1/2016 | Moon et al. |
| 2016/0224248 A1 | 8/2016 | Choi et al. |
| 2017/0220292 A1 | 8/2017 | Hashimoto |
| 2018/0089297 A1 | 3/2018 | Dong et al. |
| 2018/0150243 A1 | 5/2018 | Beard |
| 2018/0321987 A1 | 11/2018 | Benisty |
| 2019/0065102 A1 | 2/2019 | Shin et al. |
| 2019/0079702 A1 | 3/2019 | Yeon et al. |
| 2019/0146684 A1 | 5/2019 | Benisty et al. |
| 2019/0272119 A1 | 9/2019 | Brewer |
| 2019/0294344 A1 | 9/2019 | Hahn et al. |
| 2020/0019542 A1 | 1/2020 | Brown et al. |
| 2020/0241798 A1 | 7/2020 | Kanno |
| 2021/0191657 A1 | 6/2021 | Moss et al. |
| 2022/0057959 A1 | 2/2022 | Yang et al. |

OTHER PUBLICATIONS

International search report for PCT/US2022/013917 dated May 18, 2022.
Written opinion for PCT/US2022/013917 dated May 22, 2022.

* cited by examiner

CACHE BASED FLOW FOR A SIMPLE COPY COMMAND

BACKGROUND OF THE DISCLOSURE

Field of the Disclosure

Embodiments of the present disclosure generally relate to a controller for a data storage device, and more particularly, to a cache-based copy command.

Description of the Related Art

In a conventional form of a simple copy command issued by a host and carried out in a data storage device, the number of steps required to be taken before posting completion of the simple copy command causes latency in the operation of the host. For example, a simple copy command according to prior approaches may carry out the steps of developing a control path (e.g., address translation), accesses to a NAND by a FIM, LDPC error correction, NVMe metadata read, AES decryption/encryption, DMA commands.

According to prior approaches, the execution of a simple copy command requires waiting until all of the above commands are complete. As a result, completion indication is delayed while these commands are executed. Because of this delay, complications in the host command pipeline are introduced to further burden the host with additional latency.

What is needed are methods and systems to address the shortcomings of prior approaches.

SUMMARY OF THE DISCLOSURE

The present disclosure generally relates to methods and systems for executing a simple copy command in a manner that mitigates additional latency in the device. According to certain embodiments, a copy command manager that includes one or more copy command slots is provided. When a simple copy command is received from a host, a copy command slot is allocated to the command and the simple copy command is copied into the copy command slot. Upon copying the simple copy command to the copy command slot, an overlap table of the data storage device controller is updated to indicate the copy has been completed, and the completion is posted to the host. After posting, the simple copy command is carried out in the background through completion.

In one embodiment, a data storage device is disclosed that includes a copy command manager comprising a copy command slot, and a controller comprising an overlap table, the controller configured to execute a method for a simple copy. The method includes receiving a copy command from a host, receiving copy data from a NAND, and allocating the copy command slot to the copy command. The method further includes updating the overlap table, and posting a completion of the copy command to the host.

In another embodiment, a controller for a data storage device is disclosed that includes a simple copy command manager comprising a plurality of simple copy command slots, one or more memory devices comprising computer-readable instructions, and a processor coupled to the one or more memory devices and configured to execute the computer-readable instructions and cause the controller to perform a method for a simple copy. The method includes receive a simple copy command from a host comprising copying data from a first LBA to a second LBA, determine if a simple copy command slot is available, and copy the data, the first LBA, and second LBA to the simple copy command slot.

In another embodiment, a system for storing data that includes one or more memory means, and a controller means configured to perform a method for a simple copy. The method includes receiving a simple copy command from a host, receiving copy data from a NAND, and allocating, from a simple copy command manager comprising a simple copy command slot, the simple copy command slot to the simple copy command. The method further includes updating an overlap table of the controller, and posting a completion of the simple copy command to the host.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

The present disclosure generally relates to methods and systems for executing a simple copy command in a manner that mitigates additional latency in the device. According to certain embodiments, a copy command manager that includes one or more copy command slots is provided. When a simple copy command is received from a host, a copy command slot is allocated to the command, and the simple copy command is copied into the copy command slot. Upon copying the simple copy command to the copy command slot, an overlap table of the data storage device controller is updated to indicate the copy has been completed, and the completion is posted to the host. After posting, the simple copy command is carried out in the background through completion.

Figure 1:
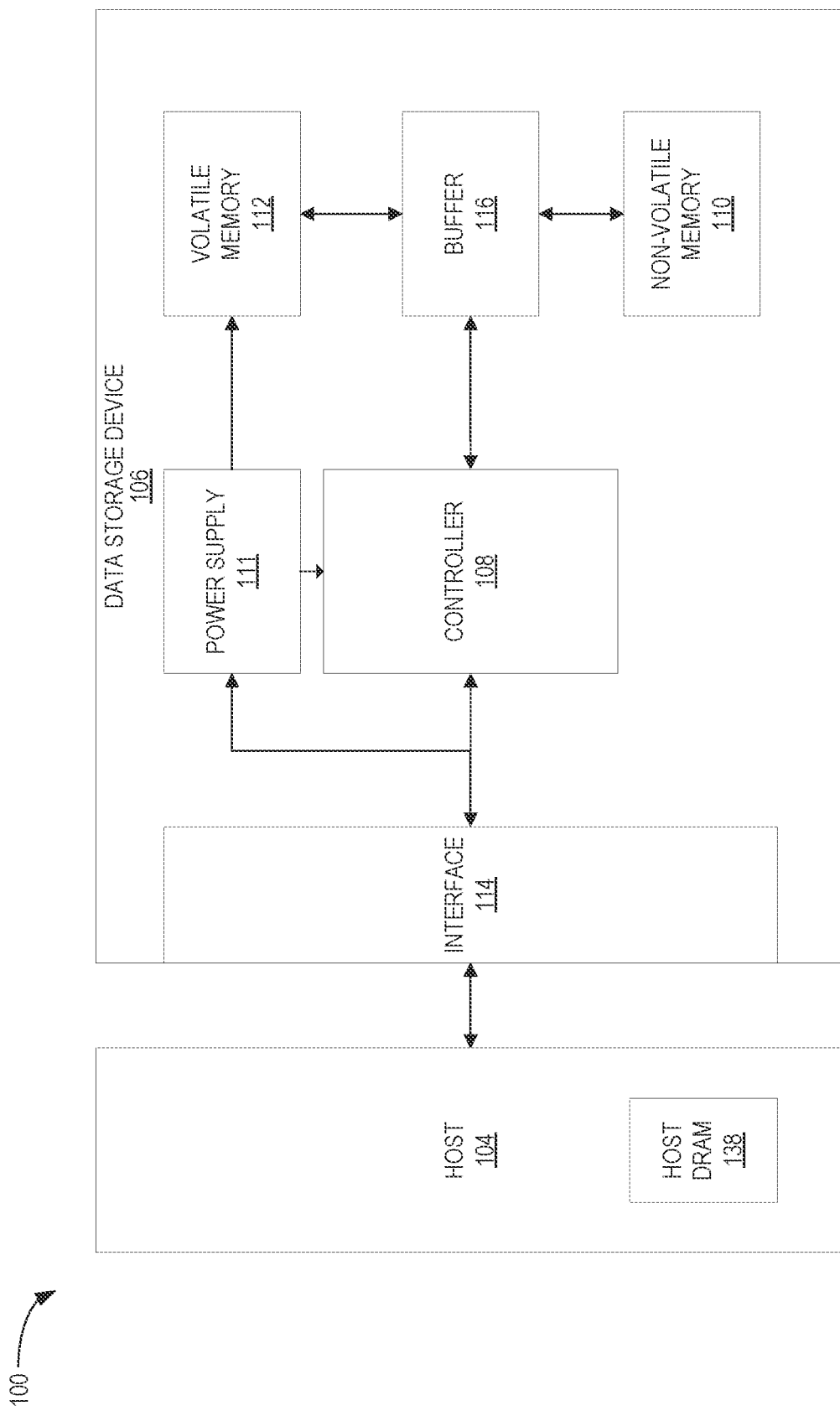
FIG. 1 depicts a schematic block diagram illustrating a storage system in which a data storage device may function as a storage device for a host device, according to certain embodiments.

FIG. 1 depicts a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit of NVM 110 may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, controller 108 may use volatile memory 112 as a cache. For instance, controller 108 may store cached information in volatile memory 112 until cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2A:
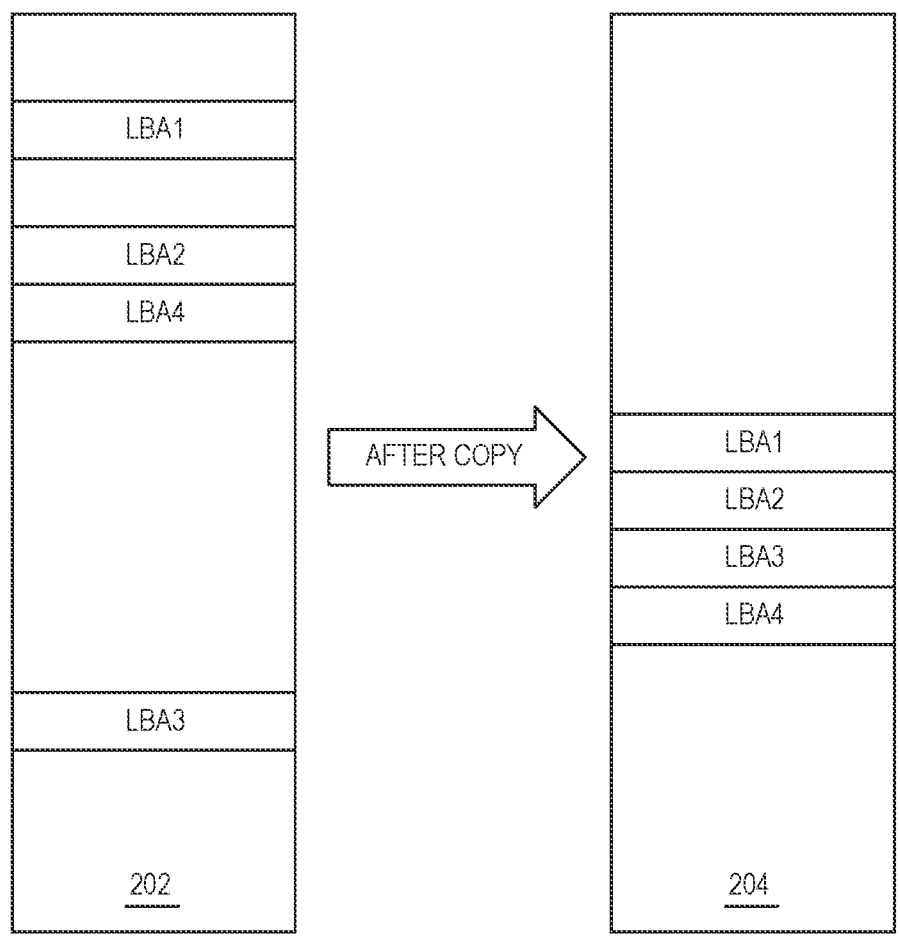
FIG. 2A depicts an illustration of a storage management operation, according to certain embodiments.

FIG. 2A depicts an illustration of a storage management operation, according to certain embodiments. The NVM, such as the NVM 110 of FIG. 1, of the data storage device, such as the data storage device 106 of FIG. 1, includes a first block 202 and a second block 204. Because data is written to blocks sequentially, the space between LBA1 and LBA2 and the space between LBA4 and LBA3 of the first block 202, prior to moving data or garbage collection, may contain invalid or old data. Any additional data written to the first block 202 is written after LBA3. Thus, the space between LBA1 and LBA2 and LBA4 and LBA3 is not effectively utilized because the valid data is not sequential, and the space between the LBAs cannot be used.

The controller, such as the controller 108 of FIG. 1, or the host device 104 of FIG. 1, may send commands for storage management operations, such as garbage collection. The LBAs of the first block 202 are copied to the controller, where the LBAs may be stored in a volatile memory of the controller. The first block is erased and allocated to the pool of free blocks (i.e., blocks not yet written to). The data stored in the controller is written sequentially to the second block 204. Because the data is written sequentially to the second block, the amount of space that the data utilizes decreases as the data is more consolidated on the block. For example, the first block 202 may have 64 KiB of available capacity. Each LBA has a size of about 4 KiB. The total size of the LBAs is 16 KiB. The first block 202 remaining capacity after the four LBAs have been written to the first block 202 is about 48 KiB. However, because the four LBAs are not written sequentially, the usable capacity may be less than about 48 KiB. When writing data sequentially to a block, such as the second block 204, the usable capacity may be equal or about equal to the remaining capacity of the block.

Figure 2B:
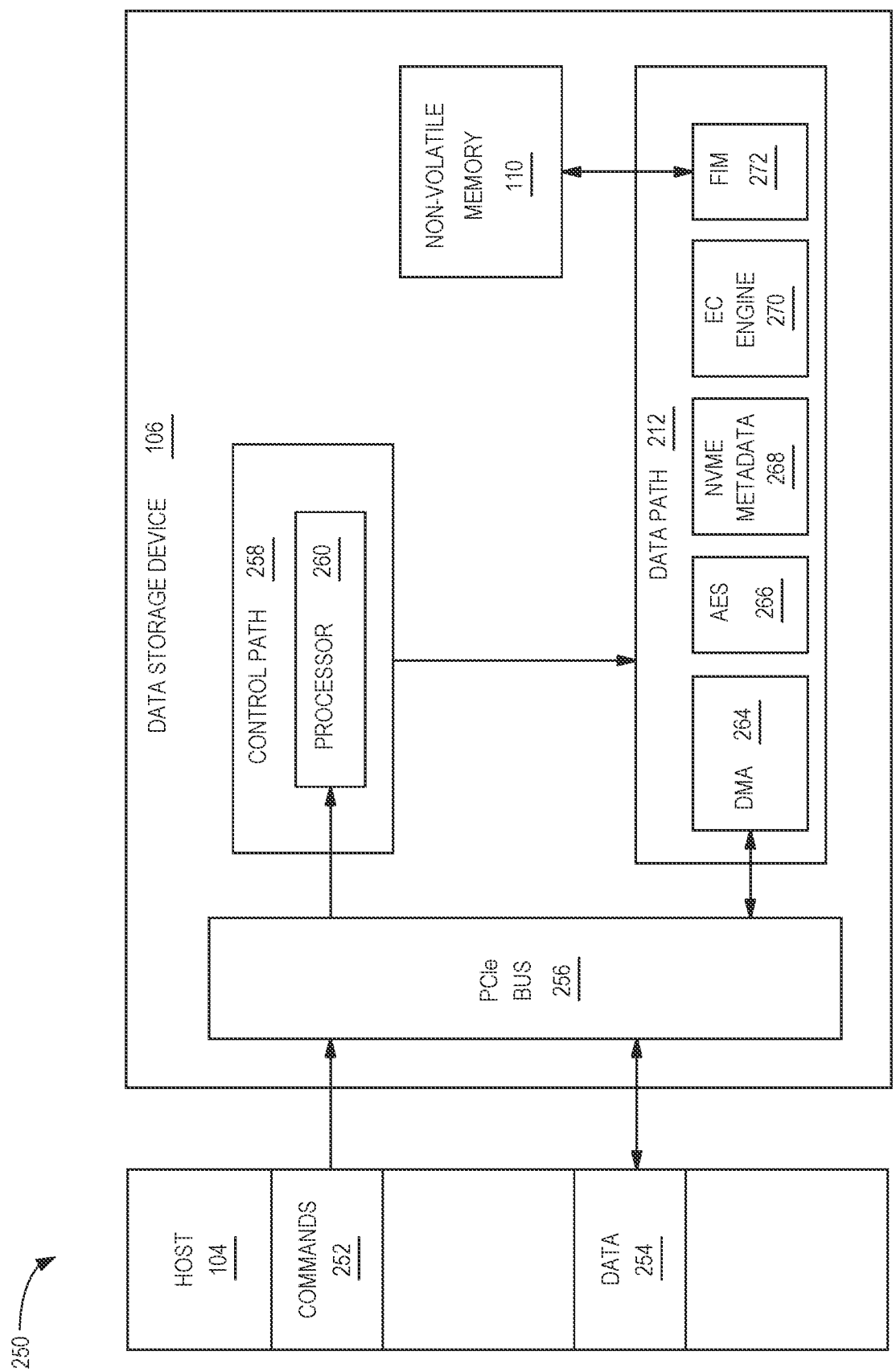
FIG. 2B depicts a schematic block diagram illustrating a storage management operation in a data storage device, according to certain embodiments.

FIG. 2B depicts a schematic block diagram illustrating a storage management operation in a data storage device, according to certain embodiments. The host device 104 issues read and/or write commands 252 to the data storage device 106. The PCIe bus 256 receives the commands 252 and the data 254 associated with the commands 252. The commands 252 are then transferred to the control path 258, where a processor 260 includes logic to process and execute the command 252. In a write operation, the data 254 is transferred to the data path 212, where instructions from the processor 260 are executed, and the data 254 passes through the various elements of the data path 212. For example, the data 254 first passes through a direct memory access (DMA) 264, where data protection is added to the data 254. The data 254 is then encrypted at the advanced encryption standard (AES) 266. At the NVMe metadata block 268, metadata is appended to data 254. In one embodiment, the metadata may include a header. The error-correction engine 270, which may be referred to as an EC Engine, generates and writes error-correction code or parity data to the data 254. The flash interface module (FIM) 272 writes the data 254 to the relevant location of the NVM 110.

However, when the data storage device 106 executes a storage management operation, such as garbage collection, the relevant data 254 is retrieved from the NVM 110 and is passed through the flash interface module (FIM) 272, error-correction engine 270, the NVMe metadata block 268, the AES 266, and the DMA 264. The relevant data then passes through the entire data path 212 and is stored at the relevant location in the NVM 110. Because the data path 212 may be occupied with storage management operations, new commands 252 may be queued because the resources of the data storage device are currently utilized.

Figure 3:
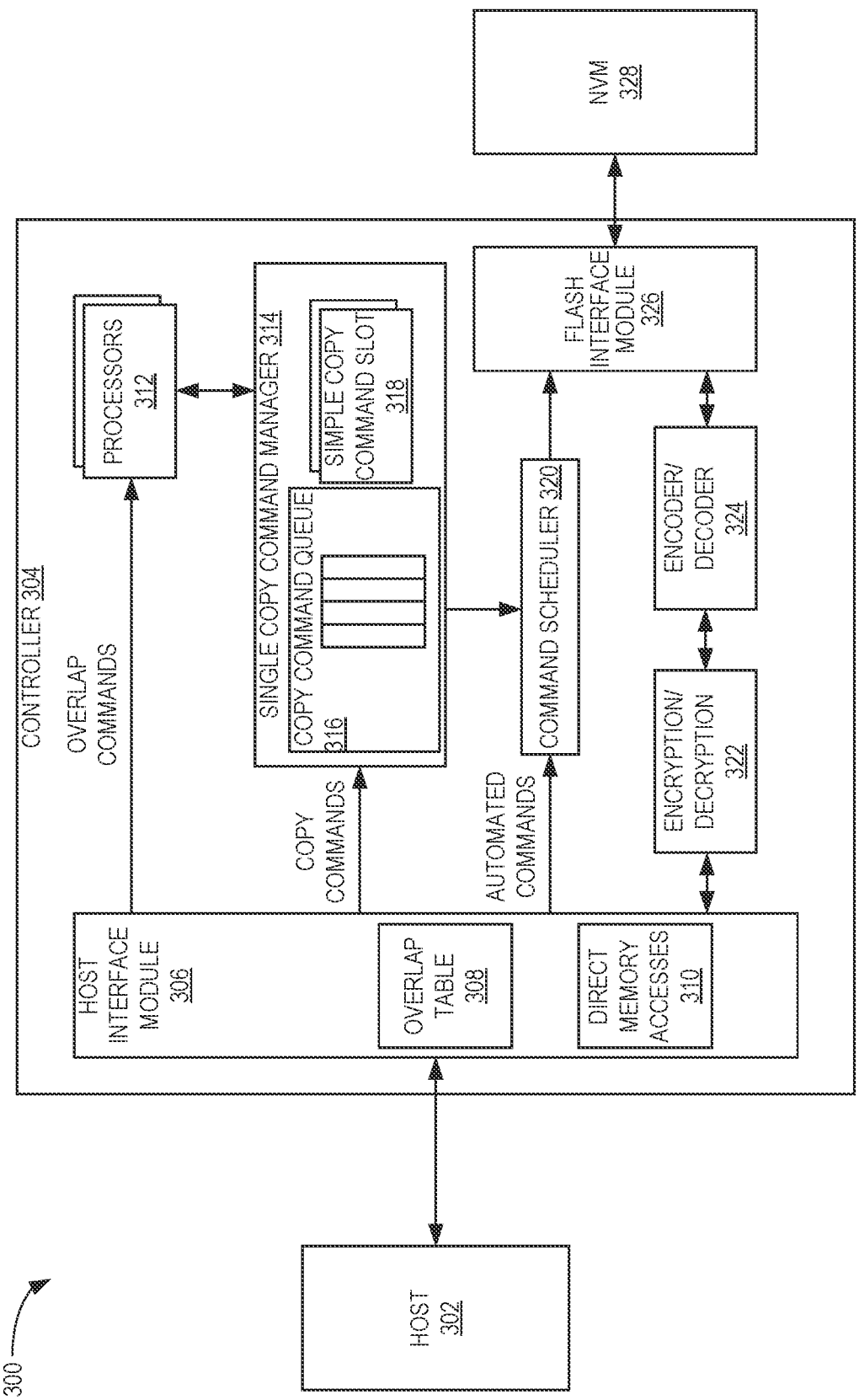
FIG. 3 depicts a schematic block diagram illustrating a simple copy command manager in a data storage device, according to certain embodiments.

FIG. 3 depicts a schematic block diagram 300 illustrating a simple copy command manager 314 in a controller 304, according to certain embodiments. Controller 304 may be implemented as the controller 108 of FIG. 1 or as part of the control path 258 of FIG. 2B. The controller 304 is coupled to a host device 302, where commands, such as simple copy commands, are generated and sent by the host device 302 to a host interface module (HIM) 306. Simple copy commands allow for copying multiple contiguous ranges to a single destination of a memory device, such as from multiple source LBAs to a single destination LBA or a contiguous sequence of LBAs. In the description herein, simple copy commands include the command and the data associated with the command. Likewise, data and other relevant information, such as completion messages, are sent back to the host device 302 via the HIM 306.

The HIM 306 includes an overlap table 308 and DMAs 310. The DMAs 310 may be the DMA 264 of FIG. 2B. The overlap table 308 may include information about the LBAs, such as LBA pointers associated with the simple copy commands and the lengths of the simple copy commands. Furthermore, when receiving simple copy commands from the host device 302, the length and LBA of the received simple copy commands are stored in the overlap table 308, such that overlaps of the LBAs of the simple copy commands may be identified.

When an overlap is identified, the HIM 306 may generate an indicator or a trigger to send the overlap command to one or more processors 312. The one or more processors 312 may determine whether the overlap command should replace a previously received simple copy command associated with the overlap or complete the previously received simple copy command and execute the overlap command after the previously received simple copy command. The one or more processors 312 transfers the overlap command to a single copy command manager 314, where the single copy command manager 314 aggregates simple copy commands and overlap commands in a copy command queue 316. The single copy command manager 314 includes one or more simple copy command slots 318. The simple copy commands are executed from the one or more simple copy command slots 318, where each slot may store one or more LBAs to be copied from a first location to a second location of the NVM 328. The single copy command manager 314 is coupled to a command scheduler 320. The simple copy commands and overlap commands are transferred to the command scheduler 320.

The data of received commands are transferred from the DMAs 310 to an encryption/decryption module 322. The encryption/decryption module 322 either encrypts the data of the simple copy commands or decrypts encrypted data retrieved from NVM 328, where the NVM 328 may be the NVM 110 of FIG. 1. The encryption/decryption module 322 is coupled to an encoder/decoder 324. The encoder/decoder 324 encodes data and decodes encoded data. The encoder/decoder 324 may be the EC engine 270 of FIG. 2B. The encryption/decryption module 322 and the encoder/decoder 324 may include logic to protect data from errors or include logic to correct errors in the data when reading the data from the NVM 328. The encoder/decoder 324 is coupled to FIM 326, where the FIM 326 may be configured to schedule, retrieve, and program data to the NVM 328.

Automated commands, such as read and write commands, are transferred from the HIM 306 to a command scheduler 320. The command scheduler 320 may be configured to schedule the received commands to be executed, such as scheduling a program operation to the NVM 328 or a read operation of the NVM 328. The command scheduler 320 is coupled to the FIM 326.

Figure 4:
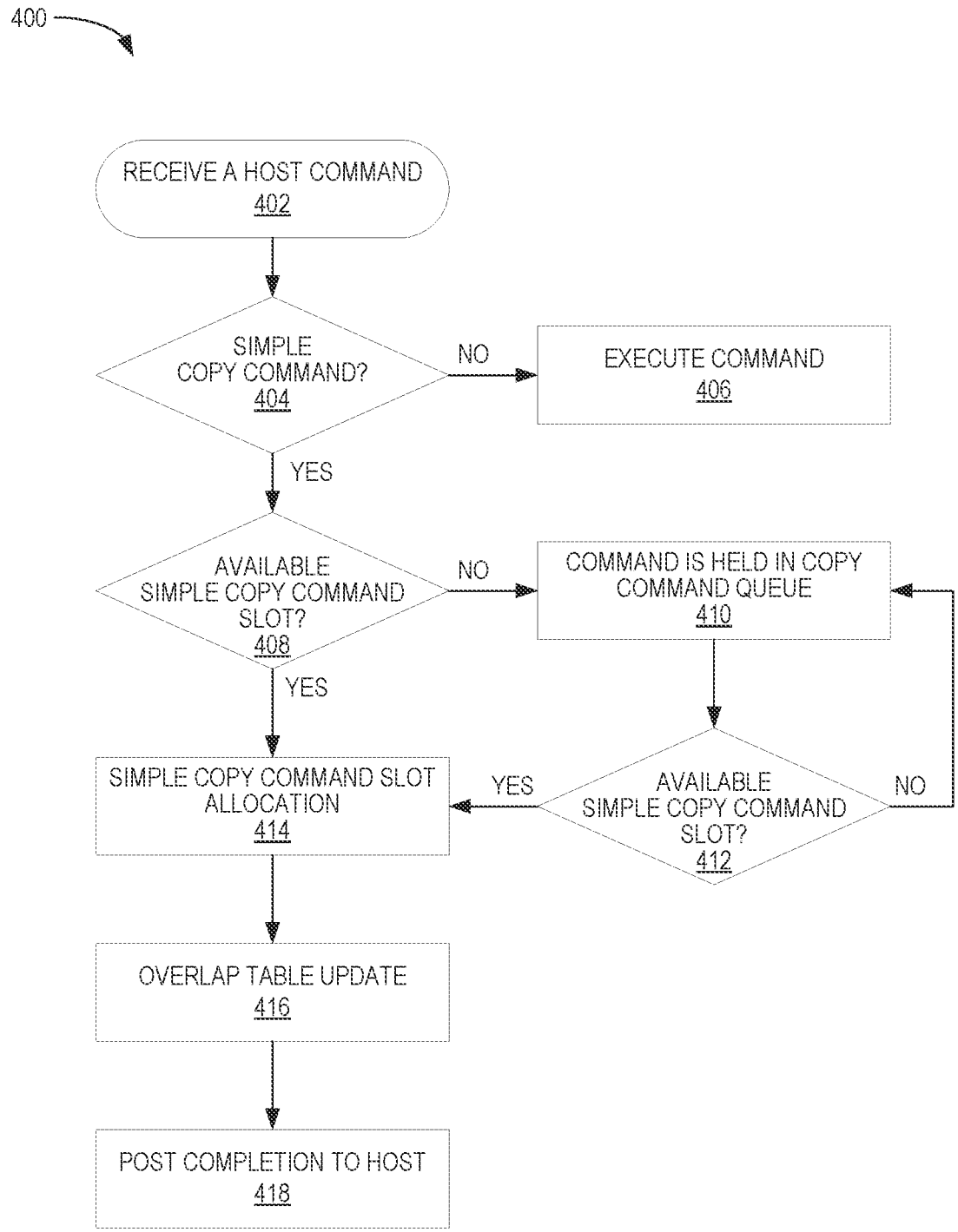
FIG. 4 depicts a flow diagram illustrating a method of executing a simple copy command, according to certain embodiments.

FIG. 4 depicts a flow diagram illustrating a method 400 of executing a simple copy command, according to certain embodiments. The method 400 may be implemented by controller 304 of FIG. 3. In some examples, the one or more processors, such as the one or more processors 312 of FIG. 3, may be configured to execute the method 400. Aspects of FIG. 3 may be referenced herein for exemplary purposes.

At block 402, a host command is received by controller 304 from the host device 302. At block 404, controller 304 determines if the received host command is a simple copy command. If the received command is not a simple copy command, then at block 406, the host command is executed normally as an automated command by transferring the host command from the HIM 306 to the command scheduler 320. However, if the received host command is a simple copy command, then at block 408, the controller 304 determines if there is any available one or more simple copy command slots 318 in the simple copy command manager 314. If there are no available slots at block 408, then the simple copy command is held in the copy command queue 316 at block 410.

If there is an available slot at block 408 or at block 412, the one or more simple copy command slots 318 is allocated to the simple copy command, such that the one or more LBAs of the simple copy command are stored in the allocated one or more simple copy command slots. At block 416, the overlap table 308 is updated. At block 418, a completion message is posted to the host device 302.

Figure 5:
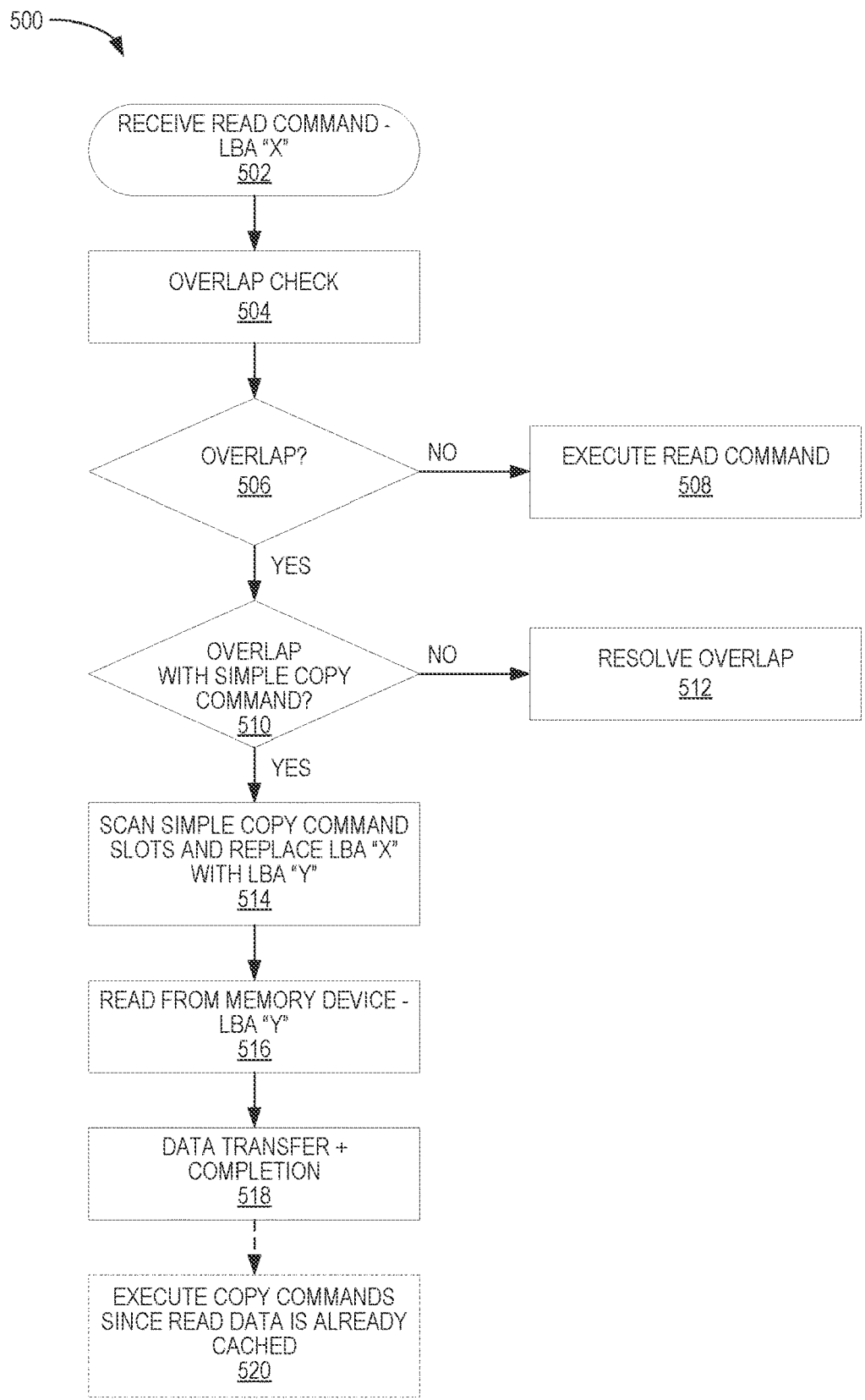
FIG. 5 depicts a flow diagram illustrating a method of executing a read command using the method of FIG. 4, according to certain embodiments.

FIG. 5 depicts a flow diagram illustrating a method 500 of executing a read command using the method 400 of FIG. 4, according to certain embodiments. The method 500 may be implemented by controller 304 of FIG. 3. In some examples, the one or more processors, such as the one or more processors 312 of FIG. 3, may be configured to execute the method 500. Aspects of FIG. 3 may be referenced herein for exemplary purposes.

At block 502, controller 304 receives a read command with an LBA "X" from the host device 302. The read command with the LBA "X" is received at the HIM 306, where at block 504, an overlap check is executed on the received read command. The LBA "X" is checked against the overlap table 308, such that any overlap in LBA location sends a trigger or a notification to the controller 304 that an LBA overlap is present. At block 506, controller 304 determines if there is an overlap. If there is no overlap present at block 506, then at block 508, the read command is executed. However, if there is an overlap at block 506, then at block 510, the controller 304 determines if the overlap is with another simple copy command. If the overlap is not with another simple copy command at block 510, then the overlap is resolved at block 512.

If there is an overlap with the simple copy command, then at block 514, the one or more simple copy command slots 318 are scanned. The LBA "X" is replaced with LBA "Y," where LBA "Y" refers to the data associated with the LBA "X" overlap. At block 516, LBA "Y" is read from the memory device, such as the NVM 328. At block 518, the data of LBA "Y" and a completion message is transferred to the host device 302. In one embodiment, at block 520, the copy commands are executed since the read data is already cached, such that the pending copy command queue (e.g., the one or more simple copy command slots 318 and the copy command queue 316) are flushed to the NVM 328.

Figure 6:
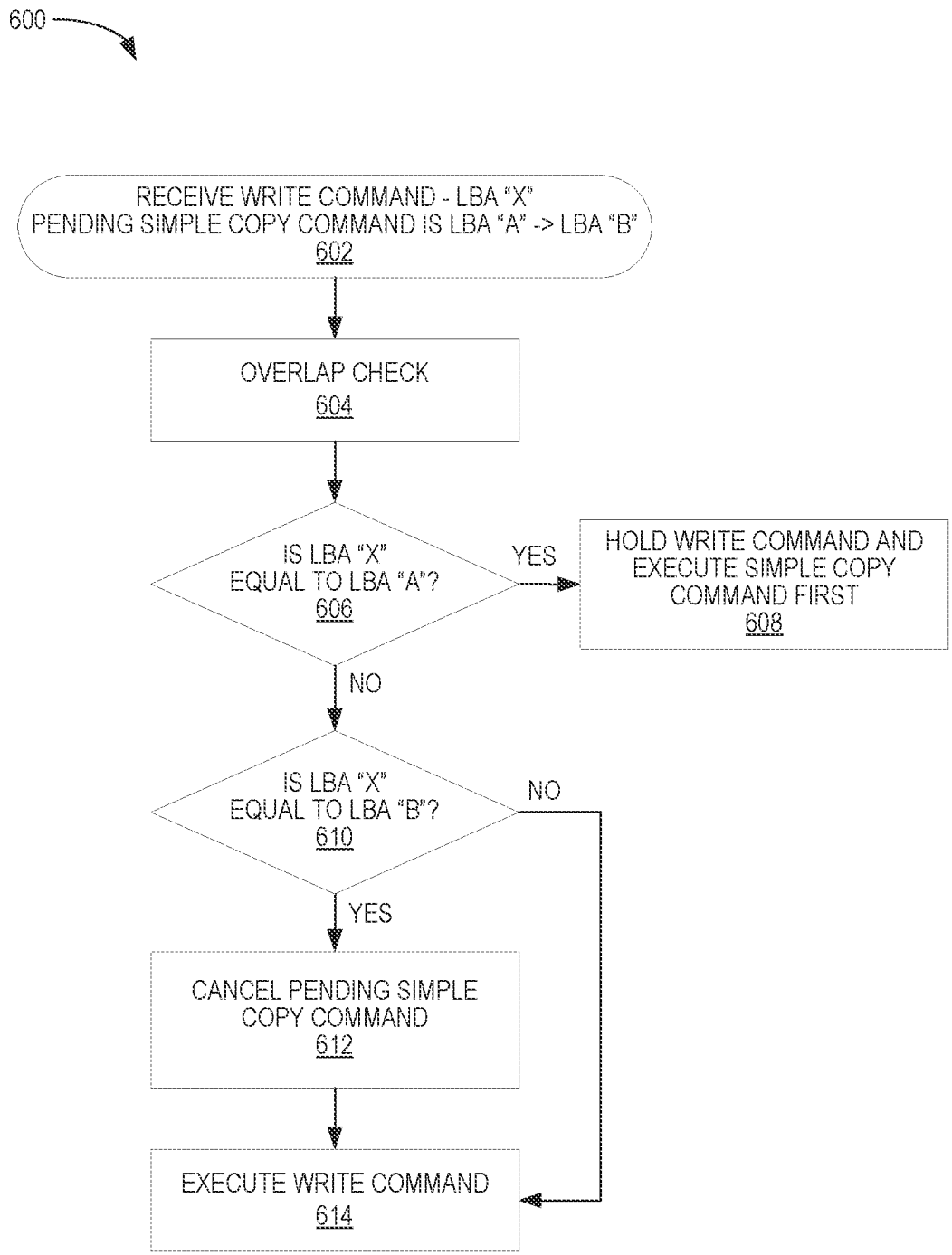
FIG. 6 depicts a flow diagram illustrating a method of executing a write command using the method of FIG. 4, according to certain embodiments.

FIG. 6 depicts a flow diagram illustrating a method 600 of executing a write command using the method 400 of FIG. 4, according to certain embodiments. The method 600 may be implemented by controller 304 of FIG. 3. In some examples, the one or more processors, such as the one or more processors 312 of FIG. 3, may be configured to execute the method 600. Aspects of FIG. 3 may be referenced herein for exemplary purposes.

At block 602, a write command with the LBA "X" is received by the controller 304 at the HIM 306 from the host device 302. The controller 304 has a pending simple copy command, where the pending simple copy command is LBA "A" to LBA "B". At block 604, the overlap table 308 is checked to determine if the received write command with the LBA "X" has an overlap with any pre-existing simple copy commands. At block 606, controller 304 determines if LBA "X" is equal to LBA "A" of the pending simple copy command. If the LBA "X" is equal to the LBA "A," then at block 608, the write command is held in a buffer, such as buffer 116 of FIG. 1, and the pending simple copy command is executed.

However, if LBA "X" is not equal to LBA "Y" at block 606, then at block 610, the controller determines if LBA "X" is equal to LBA "B." If LBA "X" is not equal to LBA "B," then the write command is executed. However, if LBA "X" does equal LBA "B," the pending simple copy command is canceled at block 612. At block 614, the write command is executed. In one embodiment, the copy commands are executed since the read data is already cached, such that the pending copy command queue (e.g., the one or more simple copy command slots 318 and the copy command queue 316) are flushed to the NVM 328.

In one example, if the pending simple copy command is LBA "A" to LBA "B" and a new simple copy command is LBA "B" to LBA "C" is received while the pending command has not been completed, then the pending simple copy command may be completed prior to executing the new simple copy command. However, in another example, the pending simple copy command may be canceled, and the new copy command may be executed, where the modified simple copy command is LBA "A" to LBA "C." The contents of both LBA "A" and LBA "B" are stored in volatile memory, such as the volatile memory 112 of FIG. 1.

Figure 7:
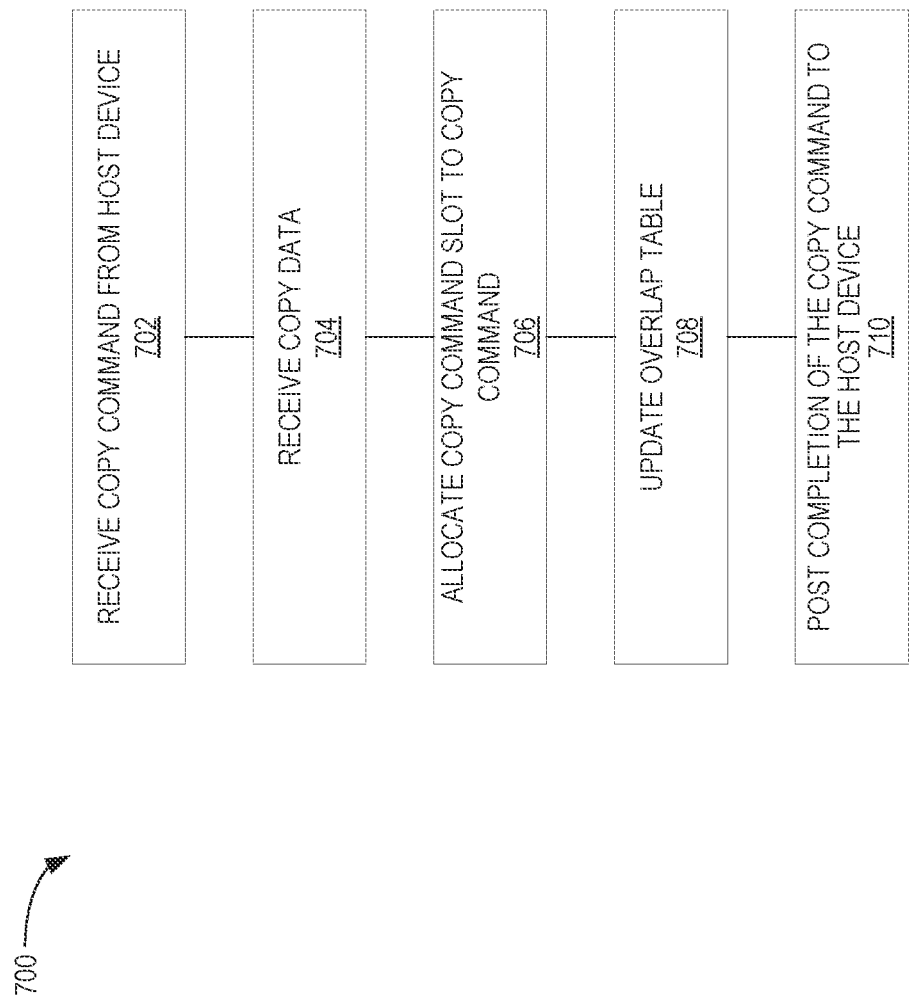
FIG. 7 depicts a flow diagram illustrating a method of executing a simple copy command, according to certain embodiments.

FIG. 7 depicts a flow diagram illustrating a method 700 of executing a simple copy command, according to certain embodiments. Aspects of FIG. 3 may be referenced herein for exemplary purposes. At block 702, a controller, such as a controller 304 of FIG. 3, receives a copy command from a host device, such as the host device 302 of FIG. 3. At block 704, the copy data associated with the copy command is received by controller 304. At block 706, a copy command slot, such as one of the one or more copy command slots 318 of FIG. 3, is allocated to the copy command. If there are no copy command slots available, the copy command is stored in a copy command queue, such as the copy command queue 316 of FIG. 3. At block 708, the overlap table is updated with the data of the received copy command. At block 710, a completion message associated with the received copy command is posted to the host device 302. In some examples, the completion message may be posted to the host prior to finishing the execution of the received copy command.

By storing data of pending simple copy commands in an overlap table and determining if an overlap exists between a pending simple copy command and a received host command, the latency of the simple copy command may be decreased, and the existing write flow may be utilized to handle the modified simple copy command execution.

In one embodiment, a data storage device is disclosed that includes a copy command manager comprising a copy command slot and a controller comprising an overlap table, the controller configured to execute a method for a simple copy. The method includes receiving a copy command from a host, receiving copy data from a NAND, and allocating the copy command slot to the copy command. The method further includes updating the overlap table and posting completion of the copy command to the host.

The posting of the completion of the copy command occurs prior to completing execution of the copy command. The copy command includes copying data from a first LBA to a second LBA. The method further includes copying the first LBA and second LBA to the copy command slot, receiving a read command from the host to read from the second LBA, and modifying the read command to read from the first LBA. The copy command manager further includes a command queue, and wherein allocating the copy command slot to the copy command further includes determining if the copy command slot is available and responsive to the copy command slot not being available, storing the copy command in the copy command queue. The copy command includes copying data from a first LBA to a second LBA. The method further includes copying the first LBA and second LBA to the copy command, receiving a copy command from the host to copy data from the first LBA to a third LBA, flushing the copy command slot, and pausing the read command until the first LBA is copied to the second LBA. The copy command includes copying data from a first LBA to a second LBA. The method further includes copying the first LBA and second LBA to the copy command slot, receiving a write command from the host to write to the first LBA, and pausing the write command. The copy command includes copying data from a first LBA to a second LBA. The method further includes copying the first LBA and second LBA to the copy command slot, receiving a command from the host to copy data from the second LBA to a third LBA, and copying the first LBA and the third LBA to a second copy command slot.

In another embodiment, a controller for a data storage device is disclosed that includes a simple copy command manager comprising a plurality of simple copy command slots, one or more memory devices comprising computer-readable instructions, and a processor coupled to the one or more memory devices and configured to execute the computer-readable instructions and cause the controller to perform a method for a simple copy. The method includes receive a simple copy command from a host comprising copying data from a first LBA to a second LBA, determine if a simple copy command slot is available, and copy the data, the first LBA, and the second LBA to the simple copy command slot.

The controller further includes an overlap table. The computer-readable instructions further cause the processor to update the overlap table and post completion of the simple copy command to the host prior to completion of the simple copy command. The computer-readable instructions further cause the processor to receive a write command from the host comprising writing a third LBA to the first LBA and pausing the write command. The computer-readable instructions further cause the processor to receive a write command from the host comprising writing a third LBA to the second LBA and cancel the simple copy command. The computer-readable instructions further cause the processor to receive a second simple copy command from the host comprising copying a second data from the second LBA to a third LBA, determine if a second simple copy command slot is available, and copy the first data, the first LBA, and third LBA to the second simple copy command slot. The computer-readable instructions further cause the processor to receive a read command from the host, including reading the second LBA and read from the first LBA. The computer-readable instructions to determine if a simple copy command slot is available further includes determining if the copy command slot is available and responsive to a command slot not being available, storing the simple copy command in the copy command queue.

In another embodiment, a system for storing data that includes one or more memory means, and a controller means configured to perform a method for a simple copy. The method includes receiving a simple copy command from a host, receiving copy data from a NAND, and allocating, from a simple copy command manager comprising a simple copy command slot, the simple copy command slot to the simple copy command. The method further includes updating an overlap table of the controller and posting a completion of the simple copy command to the host.

The simple copy command includes copying data from a first LBA to a second LBA. The method further includes copying the first LBA and second LBA to the simple copy command slot, receiving a write command from the host to write to the first LBA, and pausing the write command. The simple copy command manager further includes a simple copy command queue and wherein allocating the simple copy command slot to the simple copy command further includes determining if the simple copy command slot is available and responsive to a simple copy command slot not being available, storing the simple copy command in the simple copy command queue. The simple copy command includes copying data from a first LBA to a second LBA. The method further includes copying the first LBA and second LBA to the simple copy command slot, receiving a command from the host to copy data from the second LBA to a third LBA, and copying the first LBA and the third LBA to a second simple copy command slot. The simple copy command includes copying data from a first LBA to a second LBA. The method further includes copying the first LBA and second LBA to the simple copy command slot, receiving a read command from the host to read from the second LBA, and modifying the read command to read from the first LBA.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a controller comprising an overlap table and a copy command manager comprising a copy command slot, the controller configured to execute a method for a simple copy, the method comprising:
   receiving a copy command from a host;
   receiving copy data from a NAND;
   allocating the copy command slot to the copy command;
   updating the overlap table; and
   posting a completion of the copy command to the host, wherein the copy command manager further comprises a command queue and wherein the allocating the copy command slot to the copy command further comprises:
   determining if the copy command slot is available; and
   responsive to the copy command slot not being available, storing the copy command in the copy command queue.

2. The data storage device of claim 1, wherein the posting of the completion of the copy command occurs prior to completing execution of the copy command.

3. The data storage device of claim 2, wherein the copy command comprises copying data from a first LBA to a second LBA, the method further comprising:
   copying the first LBA and second LBA to the copy command slot;
   receiving a read command from the host to read from the second LBA; and
   modifying the read command to read from the first LBA.

4. The data storage device of claim 2, wherein the copy command comprises copying data from a first LBA to a second LBA, the method further comprising:
   copying the first LBA and second LBA to the copy command slot;
   receiving a copy command from the host to copy data from the first LBA to a third LBA;
   flushing the copy command slot; and
   pausing a read command until the first LBA is copied to the second LBA.

5. The data storage device of claim 2, wherein the copy command comprises copying data from a first LBA to a second LBA, the method further comprising:
   copying the first LBA and second LBA to the copy command slot;
   receiving a write command from the host to write to the first LBA; and
   pausing the write command.

6. A data storage device, comprising:
   a controller comprising an overlap table and a copy command manager comprising a copy command slot, the controller configured to execute a method for a simple copy, the method comprising:
   receiving a copy command from a host;
   receiving copy data from a NAND;
   allocating the copy command slot to the copy command;
   updating the overlap table; and
   posting a completion of the copy command to the host, wherein the posting of the completion of the copy command occurs prior to completing execution of the copy command, wherein the copy command comprises copying data from a first LBA to a second LBA, the method further comprising:
   copying the first LBA and second LBA to the copy command slot;
   receiving a command from the host to copy data from the second LBA to a third LBA; and
   copying the first LBA and the third LBA to a second copy command slot.

7. A controller for a data storage device, comprising:
   a simple copy command manager comprising a plurality of simple copy command slots;
   one or more memory devices comprising computer-readable instructions; and
   a processor coupled to the one or more memory devices and configured to execute the computer-readable instructions and cause the controller to perform a method for a simple copy, the method comprising:
   receive a simple copy command from a host comprising copying data from a first LBA to a second LBA;
   determine if a simple copy command slot is available; and
   copy the data, the first LBA, and second LBA to the simple copy command slot, further comprising an overlap table, the computer-readable instructions further cause the processor to:
   update the overlap table; and
   post a completion of the simple copy command to the host, prior to completing execution of the simple copy command, wherein the computer-readable instructions further cause the processor to:
   receive a write command from the host to write a third LBA to the second LBA; and
   cancel the simple copy command.

8. The controller of claim 7, further comprising an overlap table, the computer-readable instructions further cause the processor to:
   update the overlap table; and
   post a completion of the simple copy command to the host, prior to completing execution of the simple copy command.

9. The controller of claim 8, wherein the computer-readable instructions further cause the processor to:
   receive a write command from the host comprising writing a third LBA to the first LBA; and
   pausing the write command.

10. A controller for a data storage device, comprising:
   a simple copy command manager comprising a plurality of simple copy command slots;
   one or more memory devices comprising computer-readable instructions; and
   a processor coupled to the one or more memory devices and configured to execute the computer-readable instructions and cause the controller to perform a method for a simple copy, the method comprising:
      receive a simple copy command from a host comprising copying data from a first LBA to a second LBA;
      determine if a simple copy command slot is available; and
      copy the data, the first LBA, and second LBA to the simple copy command slot, further comprising an overlap table, the computer-readable instructions further cause the processor to:
         update the overlap table; and
         post a completion of the simple copy command to the host, prior to completing execution of the simple copy command, wherein the computer-readable instructions further cause the processor to:
            receive a second simple copy command from the host comprising copying a second data from the second LBA to a third LBA;
            determine if a second simple copy command slot is available; and
            copy the first data, the first LBA, and third LBA to the second simple copy command slot.

11. The controller of claim 8, wherein the computer-readable instructions further cause the processor to:
   receive a read command from the host comprising reading the second LBA; and
   read from the first LBA.

12. A controller for a data storage device, comprising:
   a simple copy command manager comprising a plurality of simple copy command slots;
   one or more memory devices comprising computer-readable instructions; and
   a processor coupled to the one or more memory devices and configured to execute the computer-readable instructions and cause the controller to perform a method for a simple copy, the method comprising:
      receive a simple copy command from a host comprising copying data from a first LBA to a second LBA;
      determine if a simple copy command slot is available; and
      copy the data, the first LBA, and second LBA to the simple copy command slot, wherein the computer-readable instructions to determine if a simple copy command slot is available further comprises:
         determining if the copy command slot is available; and
         responsive to a command slot not being available, storing the simple copy command in the copy command queue.

13. A system for storing data, comprising:
   one or more memory means; and
   a controller means configured to perform a method for a simple copy, the method comprising:
      receiving a simple copy command from a host;
      receiving copy data from a NAND;
      allocating, from a simple copy command manager comprising a simple copy command slot, the simple copy command slot to the simple copy command;
      updating an overlap table of the controller means; and
      posting a completion of the simple copy command to the host, wherein the simple copy command manager further comprises a simple copy command queue and wherein the allocating the simple copy command slot to the simple copy command further comprises:
         determining if the simple copy command slot is available; and
         responsive to a simple copy command slot not being available, storing the simple copy command in the simple copy command queue.

14. The system of claim 13, wherein the posting of the completion of the simple copy command to the host comprises posting the completion before completing execution of the simple copy command.

15. The system of claim 14, wherein the simple copy command comprises copying data from a first LBA to a second LBA, the method further comprising:
   copying the first LBA and second LBA to the simple copy command slot;
   receiving a write command from the host to write to the first LBA; and
   pausing the write command.

16. The system of claim 14, wherein the simple copy command comprises copying data from a first LBA to a second LBA, the method further comprising:
   copying the first LBA and second LBA to the simple copy command slot;
   receiving a command from the host to copy data from the second LBA to a third LBA; and
   copying the first LBA and the third LBA to a second simple copy command slot.

17. The system of claim 14, wherein the simple copy command comprises copying data from a first LBA to a second LBA, the method further comprising:
   copying the first LBA and second LBA to the simple copy command slot;
   receiving a read command from the host to read from the second LBA; and
   modifying the read command to read from the first LBA.

* * * * *